April 12, 1932.  M. EHRICKE  1,853,804
LIFTING AND LOWERING MECHANISM FOR TRACTORS AND THE LIKE
Filed June 28, 1926
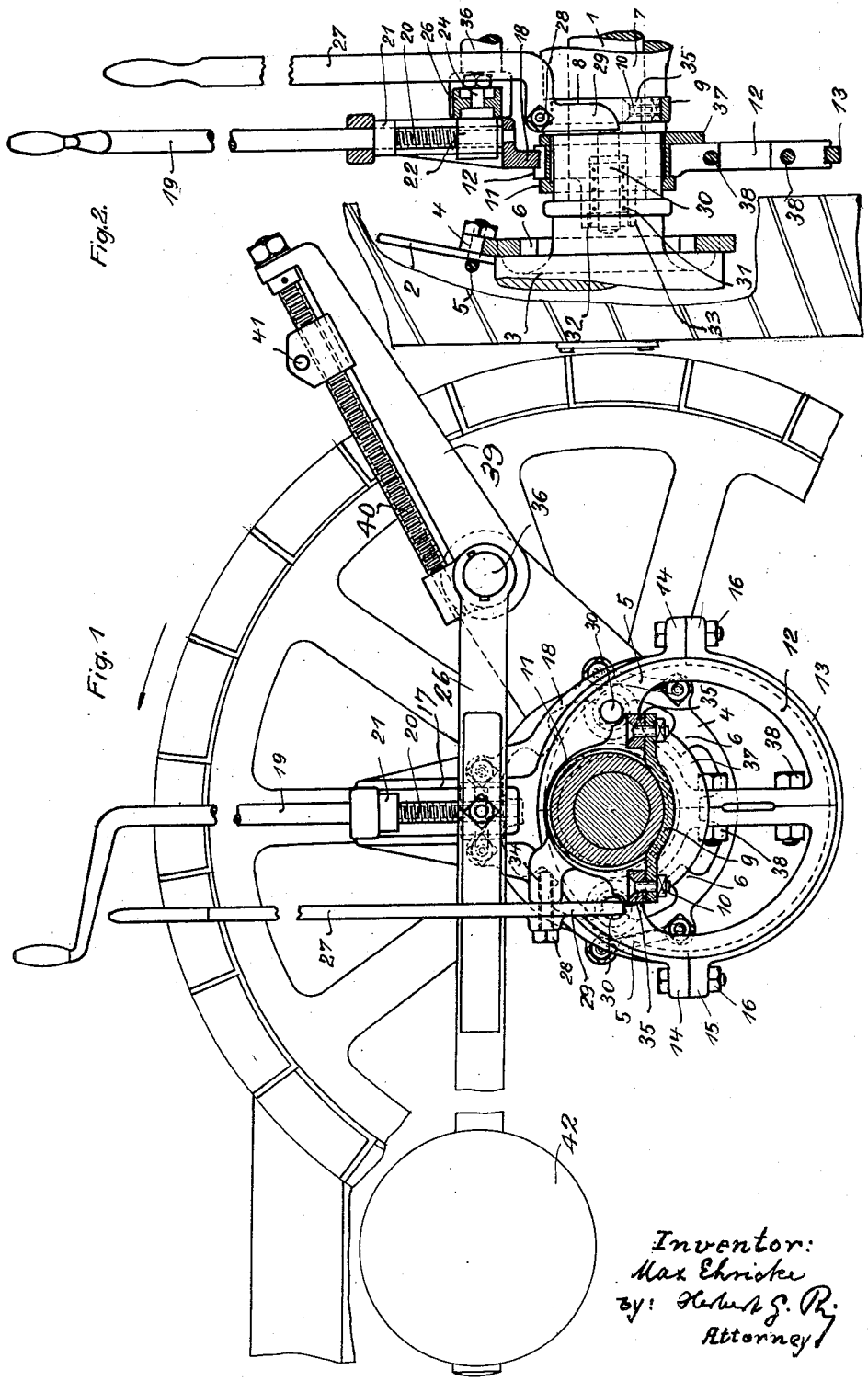
Inventor:
Max Ehricke
by: Herbert G. R.
Attorney Patented Apr. 12, 1932

1,853,804

UNITED STATES PATENT OFFICE

MAX EHRICKE, OF LEIPZIG-PLAGWITZ, GERMANY, ASSIGNOR TO THE FIRM: RUD. SACK, OF LEIPZIG-PLAGWITZ, GERMANY

LIFTING AND LOWERING MECHANISM FOR TRACTORS AND THE LIKE

Application filed June 28, 1926, Serial No. 119,032, and in Germany April 14, 1926.

The persent invention consists therein that a motor vehicle, tractor or the like which is adapted to be equipped with a variety of working implements, that is a motor vehicle of a construction similar to a tractor for ploughs on wheels or the like, is provided with a proper lifting mechanism by means of which a working implement connected with the motor vehicle or tractor may be put into and out of operation or lifted or lowered from one of the driving axles of said motor vehicle or tractor.

An embodiment of the lifting and lowering mechanism for agricultural implements according to this invention is illustrated diagrammatically by way of example in the annexed drawings, of which Fig. 1 is a side-view and Fig. 2 a cross-section of said mechanism. In the drawings, more particularly, the lifting and lowering mechanism is shown in the position which it occupies when the agricultural implement has been lifted in order to be carried over the ground without being in contact with it.

The new lifting and lowering mechanism consists of a lever 39 projecting upwardly in the rear of the tractor and being carried on a shaft 36 mounted on the tractor frame. The axle 36 upon which the lever 39 is mounted carries also a lever 26 which is provided with a counter-weight 42 by means of which the weight exerted by the agricultural implement upon the tractor may be counterbalanced. A pin 24 projecting laterally from a collar 22 engages a hole in the lever 26. The collar 22 can be moved up and down in a guide 17 fixed to the semi-circular ring 18 forming part of an eccentric 12. A screw-spindle 20 engages a threaded bore provided in the collar 22. This spindle is provided with a crank 19 by which it may be rotated, and is retained in the guide 17 by a collar 21.

The semi-circular ring 18 is connected with the other semi-circular ring 13 of the eccentric by lugs 14 and 15 and bolts 16. The sheave of the eccentric 12 is made of two parts which are connected with each other by bolts 38. The eccentric is mounted upon a sleeve 11 secured to the bearing 7 of the main driving axle 1 of the tractor, said sleeve 11 being connected with the bearing by means of a bracket 9 engaging a groove in the bearing and having two lugs connected with lugs 35 of the sleeve 11 by bolts 10. The sleeve 11 is thus prevented against radial and axial displacement.

The semi-circular members 13 and 18 form part of the eccentric and serve for rocking the lever 39, the sheave of the eccentric being rotated by one of the driving wheels of the tractor. This wheel is shown broken-away on the left-hand side of Fig. 2, said wheel comprising a hub 3 and spokes 2. The clutch proper which serves for coupling and uncoupling the eccentric to and from the wheel consists of a ring 4 fixed by bolts 5 or the like to the wheel and provided with internal teeth 6 and of one or the other of two bolts 30 located in cylindrical housings 33 on the eccentric 12, these bolts being guided by rings 32 screwed into the housings 33. Springs 31 provided around the bolts bear against collars on the bolts, and tend to retain the bolts in their housings, as shown in dotted lines in Fig. 2.

Either of the said bolts 30 may be moved out of its housing by means of a hand-lever 27 pivoted at 28 to an arm 34 projecting from the sleeve 11. In the position of the parts shown in Fig. 1, one of the bolts 30 is located just in front of the lower arm 29 of the hand-lever 27, so that when the handle is pulled to the right, as shown in Fig. 2, the bolt is pushed out of its housing 33 and engages the teeth 6 of the ring 4. In this way the driving wheel and the eccentric 12 are coupled with each other and the eccentric is consequently rotated in the direction indicated by the arrow in Fig. 1.

By action of the eccentric the bolt 30 will be displaced by the lever 27 and caused to abut against a flange 37 provided on the sleeve 11, said flange extending through an angle of about 180° of the circumference of the sleeve.

By this the bolt will be retained in engagement with the teeth 6, so that after the clutch is in engagement no further pull need be exerted upon the lever 27.

Upon rotation of the eccentric the ring 13, 18 is moved and the levers 26 and 39 are rocked to lower the agricultural implement and move it from inoperative into operative position.

After the eccentric 12 has performed about half a revolution, the bolt 30 will be disengaged from the flange 37 and from the toothed ring 4 by action of the spring 31, the clutch being thus released. The levers 26 and 39, however, will remain in their position which had previously been given to the same.

This rotation of the eccentric likewise will cause the other bolt 30 to move opposite the arm 29 of the lever 27, so that again the bolt 30 and the ring 4 may be coupled with each other if desired, and if this is done in the manner above described, by means of the hand lever 27—29, another half revolution of the eccentric 12 takes place, the eccentric now causing to rock the levers 26 and 39 in a direction to lift the agricultural implement in order to render the same inoperative.

The extent of the vertical movement of the agricultural implement may be varied by varying the position of the slide 41 upon the lever 39, or upon the spindle 40. As the spindle is screw-threaded, and the slide 41 provided with a correspondingly threaded bore, the slide may be moved along the spindle by turning the latter. Another possibility of varying the lift of the agricultural implement is afforded by the spindle 20, which can be rotated by means of its crank 19, as already described, whereby the levers 26 and 39 are rocked independently of the eccentric.

Claims:

1. A mechanism for automatically throwing into and out of engagement agricultural implements connected with a tractor, said mechanism comprising in combination with the tractor and its driving shaft, a lever, a clutch intermediate said lever and said driving shaft, and adjustable means adapted to vary the effective lifting stroke of said lever for even angles of rotation so as to effect different variations of the position of the implement.

2. A lifting and lowering mechanism for agricultural implements which are exchangeably mounted on a tractor, said mechanism comprising in combination with the tractor and its driving shaft, a lever, means for adjusting said lever to change its effective length and therewith its lifting stroke for even angles of rotation, a clutch intermediate said lever and said driving shaft, said clutch adapted to cause rotation of said lever in opposite sense by immediately subsequent even and undirectional rotations of said driving shaft.

3. A lifting and lowering mechanism for agricultural implements which are exchangeably mounted on a tractor, said mechanism comprising in combination with the tractor and its driving shaft, an operating lever, means for adjusting said operating lever to change its effective length and therewith its lifting stroke for even angles of rotation, a clutch intermediate said operating lever and said driving shaft, said clutch consisting of an eccentric having its rings pivotally connected to said operating lever, a segmental gear-wheel centrically mounted on one of the driving wheels, a resilient coupling bolt provided at said eccentric, displaceably in axial direction and adapted to engage with said segmental gear-wheel, a coupling lever adapted to engage said bolt with said gear-wheel, an annular segment adapted to contact said bolt in coupled position with said segmental gear-wheel during a full swinging motion of said operating lever and a spring adapted to disengage said bolt from said segmental gear-wheel.

4. A lifting and lowering mechanism for agricultural implements which are exchangeably mounted on a tractor, said mechanism comprising in combination with the tractor and its driving shaft, an operating lever, means for adjusting said operating lever to change its effective length and therewith its lifting stroke for even angles of rotation, a clutch intermediate said operating lever and said driving shaft, said clutch consisting of an eccentric having its rings pivotally connected to said operating lever, a segmental gear-wheel centrically mounted on one of the driving wheels, two resilient couplings bolts provided at said eccentric in diametrical opposite position on both sides of the axle of said eccentric, displaceably in axial direction and adapted to engage alternatively with said segmental gear-wheel, a coupling lever adapted to engage alternatively one of said bolts with said gear-wheel, an annular segment adapted to contact said engaged bolt in coupled position with said segmental gear-wheel during a full swinging motion of said operating lever and two springs, each of them provided at each of said bolts and adapted to disengage said bolts from said segmental gear-wheel.

5. A lifting and lowering mechanism for agricultural implements which are exchangeably connected to a tractor, said mechanism comprising in combination with the tractor and its driving shaft, a lever, a clutch intermediate said lever and said driving shaft, and adjustable means adapted to vary the effective length of said lever and therewith its lifting stroke for even angles of rotation.

6. A lifting and lowering mechanism for agricultural implements which are exchangeably mounted on a tractor, said mechanism comprising in combination with said tractor and its driving shaft and driving wheels a lever mounted upon said tractor and adapted to be lifted and lowered through a predetermined angle, a bearing connected on the one hand with a driving wheel of the tractor and on the other hand with said lever and comprising an eccentric located on said driving shaft, a ring around said eccentric, a clutch consisting of a member secured to a driving wheel and of two shiftable bolts located in the said eccentric remote from one another, one of said bolts being in position to be shifted into engagement with said first-mentioned member when the other has arrived at the end of its path in engaged condition of said clutch, and a hand-lever for actuating said bolts, substantially as set forth.

In testimony whereof I affix my signature.

MAX EHRICKE.